United States Patent
Fukushima et al.

(10) Patent No.: US 7,742,046 B2
(45) Date of Patent: Jun. 22, 2010

(54) METHOD, DEVICE, AND PROGRAM FOR PRODUCING ELEMENTAL IMAGE ARRAY FOR THREE-DIMENSIONAL IMAGE DISPLAY

(75) Inventors: Rieko Fukushima, Tokyo (JP); Ayako Takagi, Yokosuka (JP); Tatsuo Saishu, Tokyo (JP); Kazuki Taira, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 389 days.

(21) Appl. No.: 11/512,314

(22) Filed: Aug. 30, 2006

(65) Prior Publication Data
US 2007/0052729 A1 Mar. 8, 2007

(30) Foreign Application Priority Data
Aug. 31, 2005 (JP) .............................. 2005-251394

(51) Int. Cl.
G06T 15/00 (2006.01)
G02B 27/22 (2006.01)

(52) U.S. Cl. ........................... 345/419; 348/51; 348/54; 348/32; 359/15; 359/462; 359/464; 359/465; 359/494

(58) Field of Classification Search ......... 345/419–420; 348/51, 54, 32; 359/462, 463, 464, 465, 359/494, 15
See application file for complete search history.

(56) References Cited

U.S. PATENT DOCUMENTS

| 2004/0150583 | A1* | 8/2004 | Fukushima et al. | ............. 345/6 |
| 2005/0057807 | A1 | 3/2005 | Takagi et al. | |
| 2005/0099689 | A1* | 5/2005 | Fukushima et al. | ......... 359/466 |

FOREIGN PATENT DOCUMENTS

| JP | 11-098529 | 4/1999 |
| JP | 2005-091623 | 4/2005 |

OTHER PUBLICATIONS

Notification of the First Office Action issued from the Chinese Patent Office in Counterpart Application No. 200610128027.4, dated Jan. 9, 2009.

* cited by examiner

Primary Examiner—Jin-Cheng Wang
(74) Attorney, Agent, or Firm—Finnegan, Henderson, Farabow, Garrett & Dunner, L.L.P.

(57) ABSTRACT

A two-dimensional image can be displayed in a desired position, a desired aspect ratio of the display image can be maintained, and such an elemental image array as to maximize an interpolating effect can be produced. A producing method of an elemental image array for three-dimensional image display includes: converting the resolution of the two-dimensional image into substantially the same resolution of a three-dimensional image display device; obtaining multipoint images by shifting the position to sample the two-dimensional image after the resolution conversion at regular intervals in the horizontal direction; and rearranging the multipoint images according to the positional relationship between exit pupils and projecting directions.

8 Claims, 12 Drawing Sheets

FRONT ELEMENTAL IMAGE ARRAY     BACKGROUND ELEMENTAL IMAGE ARRAY

METHOD, DEVICE, AND PROGRAM FOR PRODUCING ELEMENTAL IMAGE ARRAY FOR THREE-DIMENSIONAL IMAGE DISPLAY

CROSS-REFERENCE TO RELATED APPLICATION

This application is based upon and claims the benefit of priority from prior Japanese Patent Application Laid-open No. 2005-251394 filed on Aug. 31, 2005 in Japan, the entire contents of which are incorporated herein by reference.

BACKGROUND OF THE INVENTION

1. Field of the Invention

The present invention relates to a method, device, and producing program of an elemental image array for three-dimensional image display.

2. Related Art

Parallax information that can be recognized by a viewer moving in a horizontal direction and viewing a two-dimensional image facing the viewer involves only horizontal movement of the two-dimensional image. If the two-dimensional image is located in front of the point of gaze, the two-dimensional image moves in the opposite direction from the viewer. If the two-dimensional image is located behind the point of gaze, the two-dimensional image moves in the same direction as the viewer. Accordingly, in a case where a two-dimensional image is to be displayed on a three-dimensional image display device of a horizontal parallax type, images obtained by shifting the two-dimensional image (hereinafter referred to as the original image) can be used as viewpoint images (as disclosed in JP-A 11-98529 (KOKAI), for example). By adjusting the amount of horizontal shifts, the near-side or far-side display position on a three-dimensional display can be changed.

Also, there has been suggested a method of displaying a two-dimensional image having a higher resolution than that of a three-dimensional image display device by employing the design in which two or more pixels are viewed through exit pupils (hereinafter, referred to as crosstalk). In this method, the information represented by the pixels to be viewed through the lenses is parallax information, and is also image information to be interpolated between adjacent lenses (hereinafter, referred to as interpolating effect). To achieve the interpolating effect, the display position of the two-dimensional image to be displayed needs to be slightly shifted from the surface of the three-dimensional image display device. More specifically, in a case where a lens array formed with cylindrical lenses (exit pupils) is employed as a light-ray control element, and where the distance between the lens array and the pixels for two-dimensional image display is shorter than the focal distance of the cylindrical lenses, two or more sets of parallax information are viewed in the forward order through the cylindrical lenses (a virtual image). In other words, the two or more sets of parallax information viewed through the cylindrical lenses are interpolated between the sets of information of the cylindrical lenses, by displaying the two-dimensional image in a far-side position in which the parallax information of the elemental image array is arranged in the same direction as the two-dimensional image (see JP-A 2005-091623 (KOKAI)).

In a case where an elemental image array is to be produced through horizontal movement of two-dimensional image information, and where the resolution of the original image is equal to or close to the resolution of the three-dimensional image display device, the display position is changed discretely. If the resolution of the original image is sufficiently high compared with the resolution of the three-dimensional image display device, such a problem is not caused. However, with the rendering efficiency being taken into consideration, the resolution of the original image often needs to be at least the same as the resolution of the three-dimensional image display device. If the horizontal movement of the two-dimensional image information is carried out only by the pixel unit, the range of the depth position the depth position in which the two-dimensional image can be displayed is greatly restricted. So-called "sprite processing" is known for reducing the load of image rendering. Since a number of viewing points are required for each frame in a three-dimensional displaying operation, sprite display is highly beneficial. However, if the depth position is only discretely set, an animation in which the depth position is continuously changed cannot be achieved.

In addition to that problem, in the above case where an elemental image array is to be produced through horizontal shifts of a two-dimensional image, parallax information is not obtained at all in the vertical direction. Because of that, the width of the two-dimensional image becomes larger in a nearer position, and becomes smaller in a farther position. However, the height is invariable with regular horizontal movements. As a result, the aspect ratio of the two-dimensional image is unbalanced, and the resultant image becomes unnatural, with the two-dimensional images displayed on the near side being enlarged in the horizontal direction and the two-dimensional images displayed on the far side being enlarged in the vertical direction.

Lastly, to produce an elemental image array having an interpolating effect, the depth position for achieving the most effective interpolating effect is unclear. Even if an elemental image array with varied far-side positions is produced by viewing elemental image arrays having different far-side display positions with eyes so as to determine the optimum far-side and near-side display positions, the obtained values are discrete, and it cannot be made clear whether the determined positions are the optimum positions.

SUMMARY OF THE INVENTION

The present invention is proposed in consideration of the aforementioned circumstances, and it is an object of the present invention to provide a method, device, and producing program of an elemental image array for three-dimensional image display in a three-dimensional image display device of a horizontal parallax type. With the method, the device, or the program, such an elemental image array is produced that a two-dimensional image can be displayed in a desired position, a desired aspect ratio of the displayed image can be maintained, and an optimum interpolating effect is achieved.

According to a first aspect of the present invention, there is provided a producing method of an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the method comprising:

adjusting the horizontal resolution of the two-dimensional image;

obtaining the multi-view images by shifting a position to perform sampling on the two-dimensional image in the horizontal direction at regular intervals, after the resolution adjustment; and rearranging the multi-view images according to the positional relationship between the exit pupils and the projecting directions.

According to a second aspect of the present invention, there is provided a producing device of an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the device comprising:

an image processing unit that comprises a horizontal resolution changing unit that adjusts a horizontal resolution of the two-dimensional image;

a multi-view image generating unit that obtains the multi-view images by shifting a position to perform sampling on the two-dimensional image in the horizontal direction at regular intervals, after the resolution adjustment; and a rearranging processing unit that rearranges the multi-view images according to the positional relationship between the exit pupils and the projecting directions.

According to a third aspect of the present invention, there is provided a computer-executable program for producing a elemental image array for three-dimensional image display in a three-dimensional image display device an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the program comprising instructions for:

adjusting a horizontal resolution of the two-dimensional image;

obtaining the multi-view images by shifting a position to perform sampling on the two-dimensional image in the horizontal direction at regular intervals, after the resolution adjustment; and rearranging the multi-view images according to the positional relationship between the exit pupils and the projecting directions.

DESCRIPTION OF THE EMBODIMENTS

Figure 1:
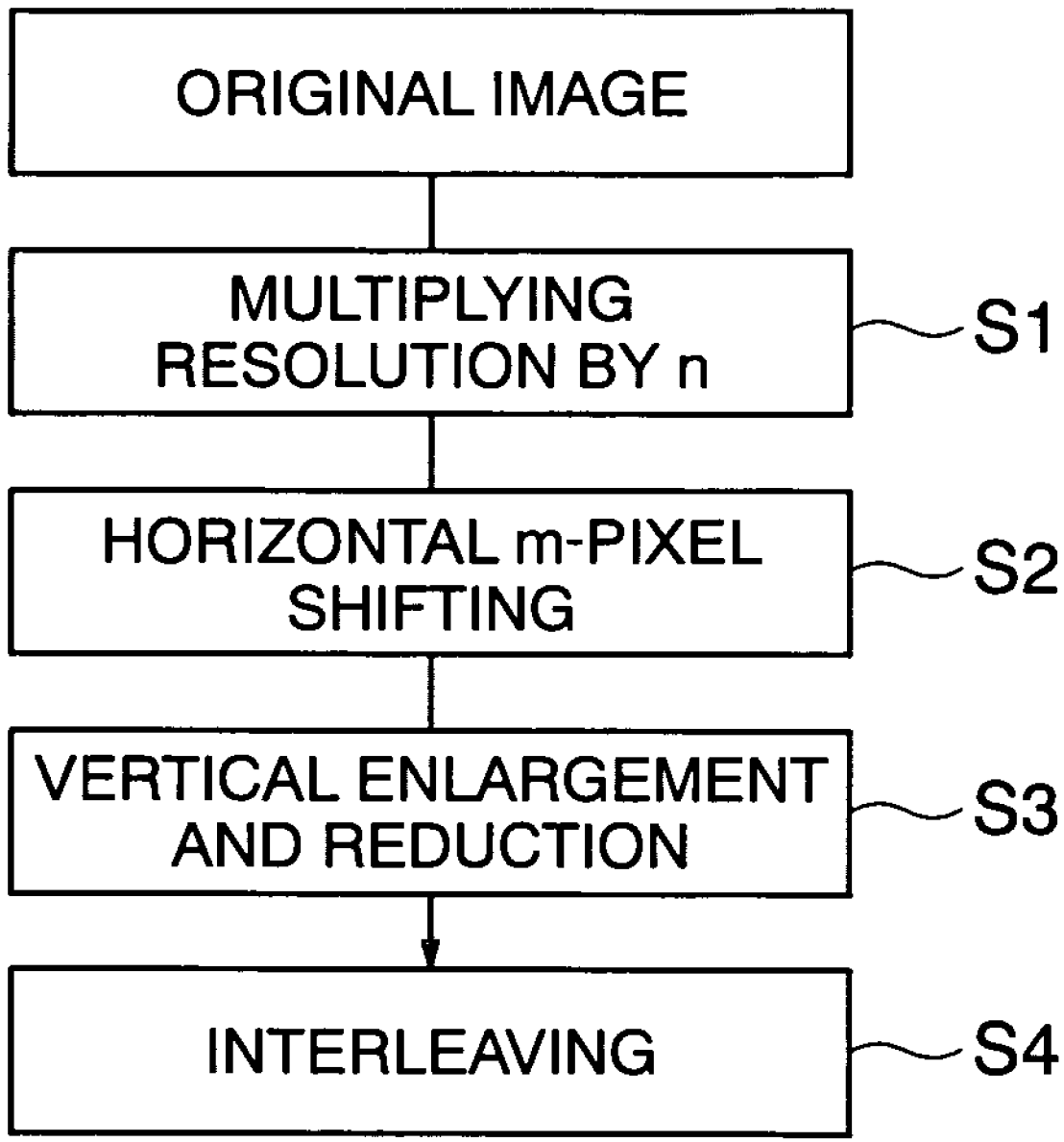
FIG. 1 is a flowchart for explaining for the procedures for a producing method of according to a first embodiment of the present invention.

The following is a description of embodiments of the present invention, with reference to the accompanying drawings. In the drawings, components with like functions are denoted by like reference numerals, and explanation of them will not be repeated.

First Embodiment

Referring to FIGS. 1 through 4, a producing method of an elemental image array for three-dimensional image display according to a first embodiment of the present invention will be described.

First, the principles of the producing method of an elemental image array for three-dimensional image display of this embodiment are described with reference to FIGS. 2 through 4(b).

Figure 2:
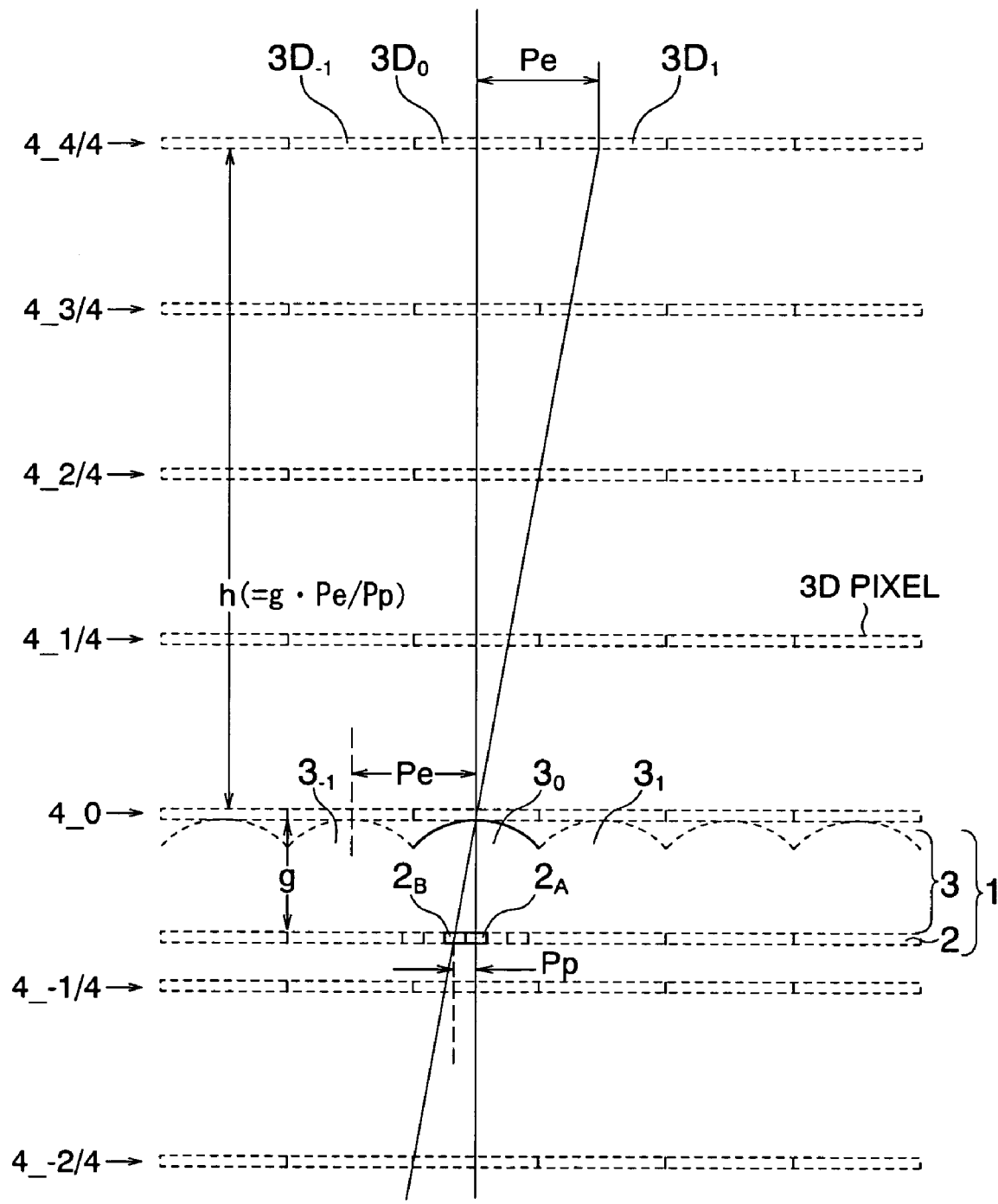
FIG. 2 is a diagram for explaining the principles of the producing method according to the first embodiment.

The producing method of this embodiment is implemented in a three-dimensional image display device of a horizontal parallax type. FIG. 2 is a horizontal cross-sectional view of the horizontal-parallax three-dimensional image display device. This horizontal-parallax three-dimensional image display device 1 includes a two-dimensional image display device 2 that is formed with a liquid crystal panel, for example, and a light-ray control element 3 that is formed with a lenticular sheet having exit pupils, for example. The two-dimensional image display device 2 has pixels arranged two-dimensionally, and each pixel has a different region in which the image information represented by the pixel is viewed by the light-ray control element 3. Pixels are horizontally allocated to each one exit pupil. Where such a group of pixels are the pixels for displaying an elemental image, the image information according to the direction in which each pixel for displaying an elemental image is to be viewed via the corresponding exit pupil 3 is allocated to the pixels for displaying the elemental image. By doing so, parallax information is generated in the horizontal direction, and a three-dimensional image is recognized by a viewer.

As shown in FIG. 2, the pixel of the lenticular sheet 2 located immediately behind an exit pupil $3_0$ is $2_A$, the pixel located on the left of the pixel $2_A$ is $2_B$, the three-dimensional image display pixel (hereinafter also referred to as the 3D pixel) corresponding to the exit pupil $3_0$ facing the pixel $2_A$ is $3D_0$, the 3D pixel corresponding to the exit pupil $3_1$ on the right is $3D_{+1}$, and the 3D pixel corresponding to the exit pupil $3_{-1}$ on the left is $3D_{-1}$. As can be seen from FIG. 2, the display position of the two-dimensional image is determined by the relationship between the image information represented by the pixel $2_A$ and the image information represented by the pixel $2_B$. If the pixel $2_B$ represents the information of the 3D pixel $3D_0$ that is the same as the information represented by the pixel $2_A$, the two-dimensional image is displayed in a position 4_0. The position 4_0 is on the surface of the lenticular sheet 2. If the pixel $2_B$ represents the information of the 3D pixel $3D_{+1}$, the two-dimensional image is displayed in a position 4_4/4. The position 4_4/4 is at a distance of h (=g×Pe/Pp) on the "near side" of the surface of the lenticular sheet 2 (or on the opposite side of the two-dimensional image display device 2). Here, Pe represents the pitch of the exit pupils, and Pp represents the pitch of the pixels of the two-dimensional image display device.

Accordingly, in a case where a two-dimensional image (an original image) of the same resolution as that of the three-dimensional image display device 1 is used, the display position of the two-dimensional image is limited to a position at an integral multiple of h. However, as can be seen from FIG. 2, the display position can be shifted by h/4 by multiplying the resolution of the original image by n-times, for example, 4-times. More specifically, if the pixel $2_B$ represents the image information obtained by adding ¼ of the difference between the image information of the 3D pixel $3D_{+1}$ and the image information of the 3D pixel $3D_0$ (which is "the image information of the 3D pixel $3D_{+1}$"–"the image information of the 3D pixel $3D_0$") to the image information of the 3D pixel $3D_0$, the two-dimensional image can be displayed in the position 4_1/4 (see FIG. 2). Here, the position 4_1/4 is at the distance of h/4 on the near side of the surface of the lenticular sheet 2.

Likewise, if the pixel $2_B$ represents the image information obtained by adding 2/4 of the difference between the image information of the 3D pixel $3D_{+1}$ and the image information of the 3D pixel $3D_0$ to the image information of the 3D pixel $3D_0$, the two-dimensional image can be displayed in the position 4_2/4. If the pixel $2_B$ represents the image information obtained by adding ¾ of the difference between the image information of the 3D pixel $3D_{+1}$ and the image information of the 3D pixel $3D_0$ to the image information of the 3D pixel $3D_0$, the two-dimensional image can be displayed in the position 4_3/4. Here, the position 4_2/4 is at the distance of 2 h/4 on the near side of the surface of the lenticular sheet 2, and the position 4_3/4 is at the distance of 3 h/4 on the near side of the surface of the lenticular sheet 2.

Further, if the pixel $2_B$ represents the image information obtained by adding −¼ of the difference between the image information of the 3D pixel $3D_{+1}$ and the image information of the 3D pixel $3D_0$ to the image information of the 3D pixel $3D_0$, the two-dimensional image can be displayed in the position 4_−1/4. If the pixel $2_B$ represents the image information obtained by adding −2/4 of the difference between the image information of the 3D pixel $3D_{+1}$ and the image information of the 3D pixel $3D_0$ to the image information of the 3D pixel $3D_0$, the two-dimensional image can be displayed in the position 4_−2/4. Here, the position 4_−1/4 is at the distance of h/4 on the far side of the surface of the lenticular sheet 2 (or on the same side as the two-dimensional image display device), and the position 4_−2/4 is at the distance of 2 h/4 on the far side of the surface of the lenticular sheet 2. In this manner, the display position on the far side of the surface of the lenticular sheet 2 can also be shifted at narrow intervals.

As is apparent from the above description, viewpoint images are formed by multiplying the original image by n and shifting the sampling position by m pixels, so that the following equation is satisfied:

$$x:g = m/n \times Pe:Pp \quad (1)$$

where n is a natural number; and m is an integer except 0. In this manner, an elemental image array is formed, so as to display a two-dimensional image in a position x.

Figures 3A, 3B:
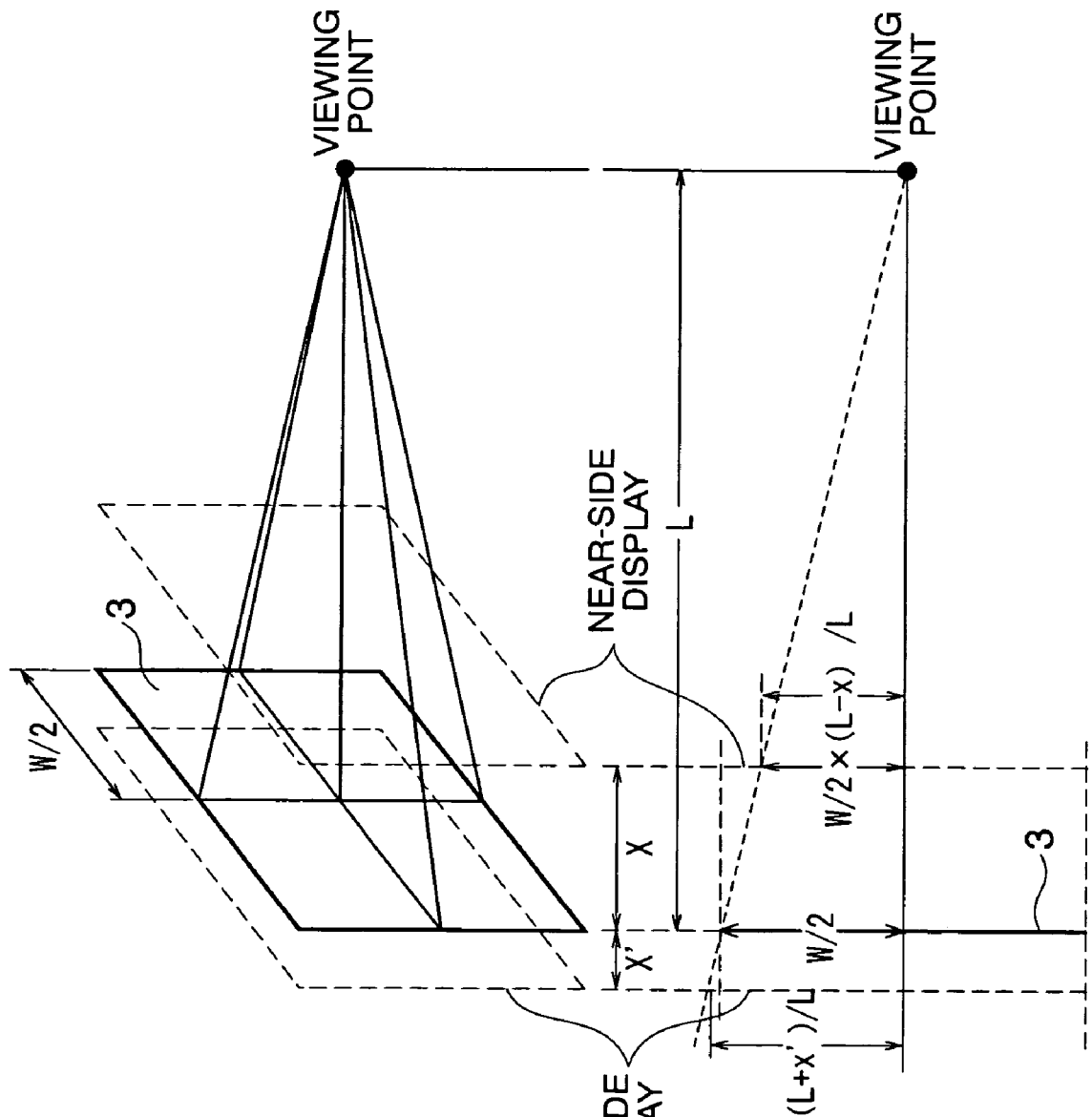
FIGS. 3(a) and 3(b) are a diagram for explaining enlargement and reduction in the longitudinal direction depending on the display position of the two-dimensional image display device according to the producing method of the first embodiment.

Referring now to FIGS. 3(a) and 3(b), enlargement and reduction in the longitudinal direction according to the display position are described. FIG. 3(a) is a perspective view of an example of a two-dimensional image displayed in a "near-side position". FIG. 3(b) is a horizontal cross-sectional view of the two-dimensional image. In a case where the viewing distance is L and the distance between the display position and the surface of the lenticular sheet 2 is x, a viewer at the viewing point recognizes the horizontal direction of the two-dimensional image displayed in the display position x as an enlarged image, because the display position x is on the near side and the viewer observes the object in a perspective fashion. However, the vertical direction of the two-dimensional image is not changed. In other words, a two-dimensional image displayed on the near side is enlarged in the horizontal direction, and the difference between the aspect ratio and "1" becomes larger as the distance between the display position and the surface of the lenticular sheet 2 becomes longer. With the aspect ratio being the proportion of the horizontal length to the vertical length, the aspect ratio of a two-dimensional image displayed in the display position x is larger than 1. In a case where a half of the width of the display region on the display face is W/2 and the viewing distance is L, as shown in FIG. 3(b), a half of the width of the display region of a two-dimensional image in a near-side position is W/2×(L−x)/L, and the aspect ratio of the two-dimensional image displayed in the near-side position is larger than 1.

The same applies to the far side. A two-dimensional image displayed in a far-side display position x' is reduced only in the horizontal direction. The difference between the aspect ratio and "1" becomes larger as the display position becomes farther from the surface of the lenticular sheet 2, and the aspect ratio is smaller than "1". As shown in FIG. 3(b), a half of the width of the display region of a two-dimensional image in a far-side position is W/2×(L−x')/L, and the aspect ratio of the two-dimensional image displayed in the depth position is smaller than 1. In this manner, enlargement and reduction are performed so as to satisfy the following equation:

$$H' = H \times L/(L-x) \quad (2)$$

where H represents the original height of the original image, and H' represents the desired height of each viewpoint image, as can be seen from FIG. 3(b). In this manner, a desired aspect ratio can be maintained.

Figures 4A, 4B:
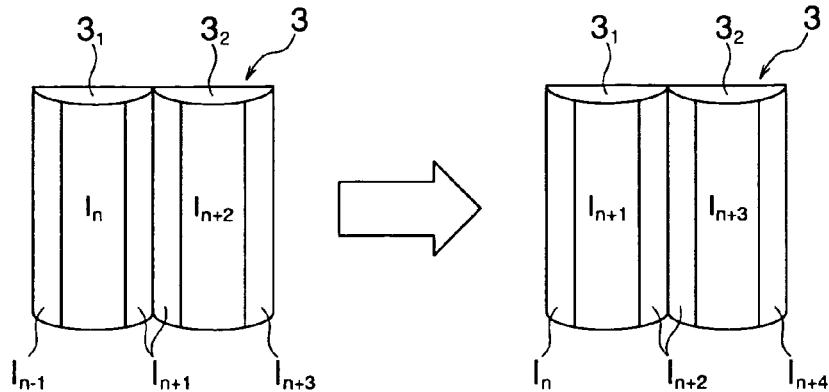
FIGS. 4(a) and 4(b) are a diagram for explaining a producing method of an elemental image array for achieving an interpolating effect according to the producing method of the first embodiment.

Lastly, a producing method of an elemental image array for achieving an interpolating effect is described. FIGS. 4(a) and 4(b) show how the pixels are viewed through the exit pupils in a case where the crosstalk c is two pixels. FIG. 4(a) shows how the pixels are viewed through the exit pupils when the viewer is situated right in front of an exit pupil $3_1$ and the horizontal resolution is twice as high. FIG. 4(b) shows how the pixels are viewed through the exit pupils when the viewer moves to the left.

In a case where the image information seen in the center of the exit pupil $3_1$ (=a 3D pixel) is $I_n$ and the image information seen in the center of the adjacent exit pupil $3_2$ is $I_{n+2}$, as shown in FIG. 4(a), the image to be displayed on the pixel in between should be $I_{n+1}$. If the viewer moves to the left in this situation in a case where the image information seen in the center of the exit pupil $3_1$ is $I_{n+1}$ and the image information seen in the center of the adjacent exit pupil $3_2$ is $I_{n+4}$, as shown in FIG. 4(b), the image to be displayed on the pixel in between is $I_{n+2}$, being displayed on the far side.

By arranging the sets of parallax information so as to satisfy the above conditions, the image information displayed on the pixels viewed through the exit pupils is turned into interpolating data, regardless of the position of the viewer. To produce such an elemental image array, parallax images should be created to produce an elemental image array by shifting the usage position of an image formed by enlarging the original image n times with m-pixel pitch, so that the following equation is satisfied:

$$m/n = 1/c \quad (3)$$

As a result, the display position is the one according to the equation (1). When interpolating is performed in a case where the thickness of the lens is smaller than the focal length as described in the conventional art ("interpolation 1"), the parallax image displayed on the pixel $2_B$ shown in FIG. 2 is shifted and interpolated between the 3D pixels $3D_0$ and $3D_1$, because the arrangement of the parallax information is to be viewed as it is through the lens. When interpolating is performed in a case where the thickness of the lens is larger than the focal length as in the present invention ("interpolation 2"), the parallax image displayed on the pixel $2_B$ shown in FIG. 2 is shifted and interpolated between the 3D pixels $3D_0$ and $3D_{-1}$, because the arrangement of the parallax information is to be reversed when viewed through the lens.

As is apparent from the above description, the producing method of an elemental image array for three-dimensional image display of this embodiment involves the procedures shown in the flowchart of FIG. 1. More specifically, the method includes: the step of multiplying the resolution of a two-dimensional image (an original image), which is the same or substantially the same (k times as high) as the resolution of a three-dimensional image display device, by n (step S1 in FIG. 1); the step of shifting the sampling position of the image after the resolution conversion at regular intervals in the horizontal direction ("m-pixel shifting"), thereby forming multi-view images (step S2 in FIG. 1); the step of correcting the aspect ratios of the multi-view images or rearranging the multi-view images according to the positional relationship between the exit pupils and the projecting direction, thereby performing longitudinal enlargement/reduction and interleaving (steps S3 and S4 in FIG. 1). Although the vertical enlarging/reducing operation is performed after the "m-pixel shifting", it may be performed anytime after the "original image". Through those procedures, the display position of the two-dimensional image can be arbitrarily set, and a desired aspect ratio can be maintained. Furthermore, an elemental image array with an optimum interpolating effect can be produced, with the performance of the light-ray control element being taken into consideration.

In this embodiment, the resolution of the original two-dimensional image (the original image) prior to the resolution conversion is the same as the resolution of the three-dimensional image display device. However, if the resolution of the original image is k times as high as the resolution of the three-dimensional image display device, it is necessary to satisfy the following equation:

$$x:g = m/k/n \times Pe:Pp \quad (4)$$

where n of the equation (1) is replaced with n×k.

In the step of changing the resolution or the image size, an image filtering method such as a "nearest neighbor method", a "bilinear method", or a "bicubic method", may be employed, and different filters may be used for multiplying the resolution by n-times (step S1 in FIG. 1) and the vertical enlargement/reduction (step S3 in FIG. 2).

Figure 18:
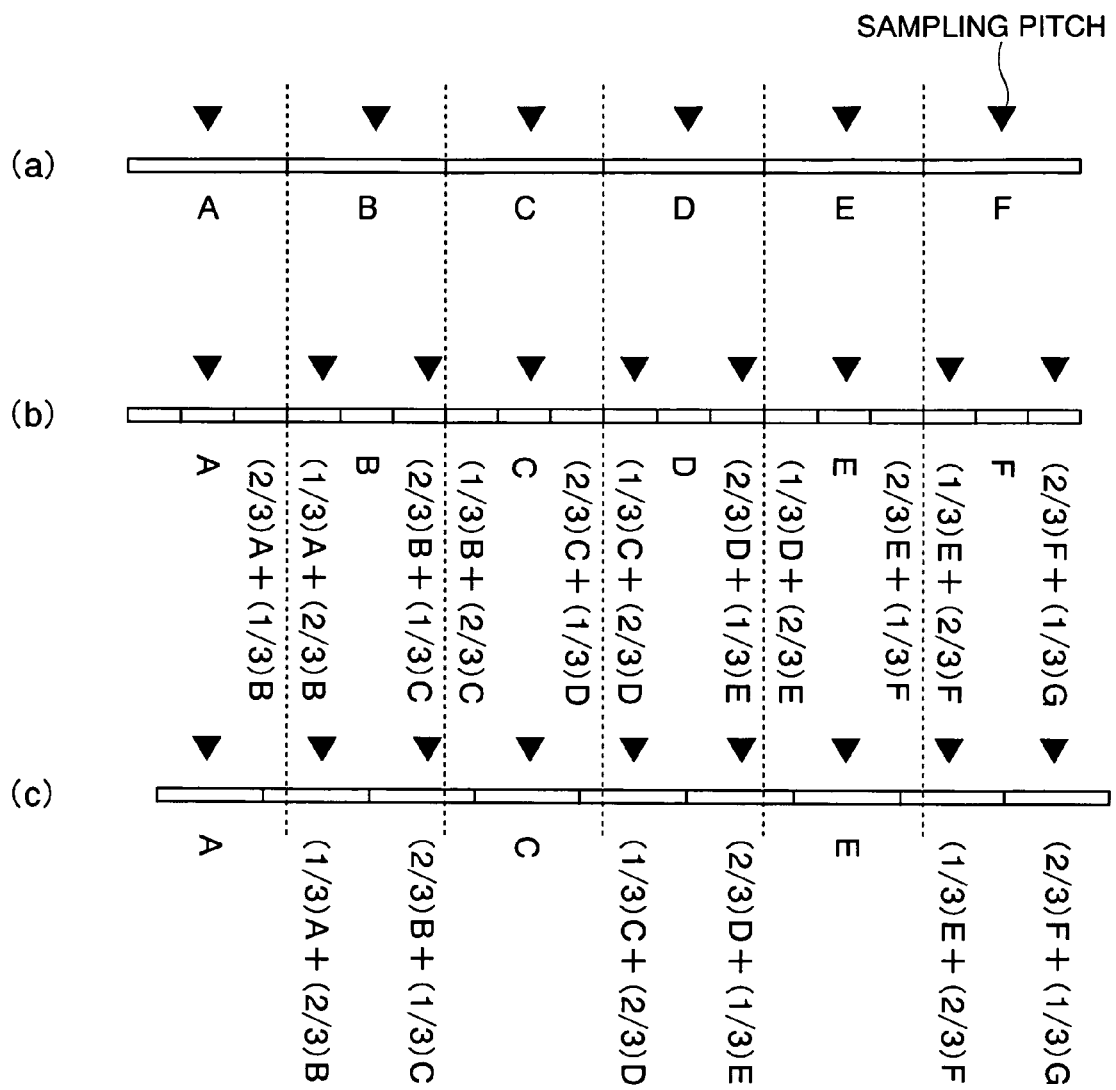
FIGS. 18(a), 18(b), and 18(c) are explanatory diagrams for explaining a method of once enlarging and then resampling a two-dimensional image having substantially the same resolution as the resolution of a three-dimensional image display device.

As described above, in order to arbitrarily set the display position of a two-dimensional image in a three-dimensional image display device 1, it is necessary to make the sampling pitch of the two-dimensional image for forming an elemental image shorter than the exit pupil pitch Pe. Accordingly, a two-dimensional image having substantially the same resolution as the resolution of the three-dimensional image display is once enlarged and then resampled. Specifically, in a case where the resampling should be performed with a horizontal pitch (m/n) times that of the original image, first the horizontal resolution is multiplied by n, and then the resampling is performed so as to achieve the (m/n) horizontal resolution. This will be explained with reference to FIGS. 18(a), 18(b), and 18(c). FIG. 18(a) shows the horizontal resolution of the original image. When, for example, resampling should be performed with the pitch ⅔ times (=m/n times) the pixel pitch, the horizontal resolution is multiplied by 3 using image interpolation, and then the sampling is performed for every two pixels (FIG. 18(b)). Such resampling can be directly performed by image interpolation. That is to say, a data item at the desired resampling position can be directly created by image interpolation (FIG. 18(c)). FIGS. 18(b) and 18(c) show the rate of occupancy of the original image in a case of a simplest linear interpolation, and the filter used in image interpolation for changing the sampling pitch can be any of the generally-used filters. Furthermore, the image data items used to create a data item between image information items B and C, for example, are not limited to the image information items B and C.

As described above, in this embodiment, a two-dimensional image can be displayed in a desired position simply through enlargement/reduction and rearrangement of the original two-dimensional image in a three-dimensional image display device. Furthermore, a desired aspect ratio can be maintained for each displayed image, and an elemental image array with an optimum interpolating effect can be produced.

The data obtained through the "interpolation 2" is more natural than the data obtained through the "interpolation 1", and exhibits a "robust" condition with a change in lens thickness or a change in viewing position.

Second Embodiment

Figure 5:
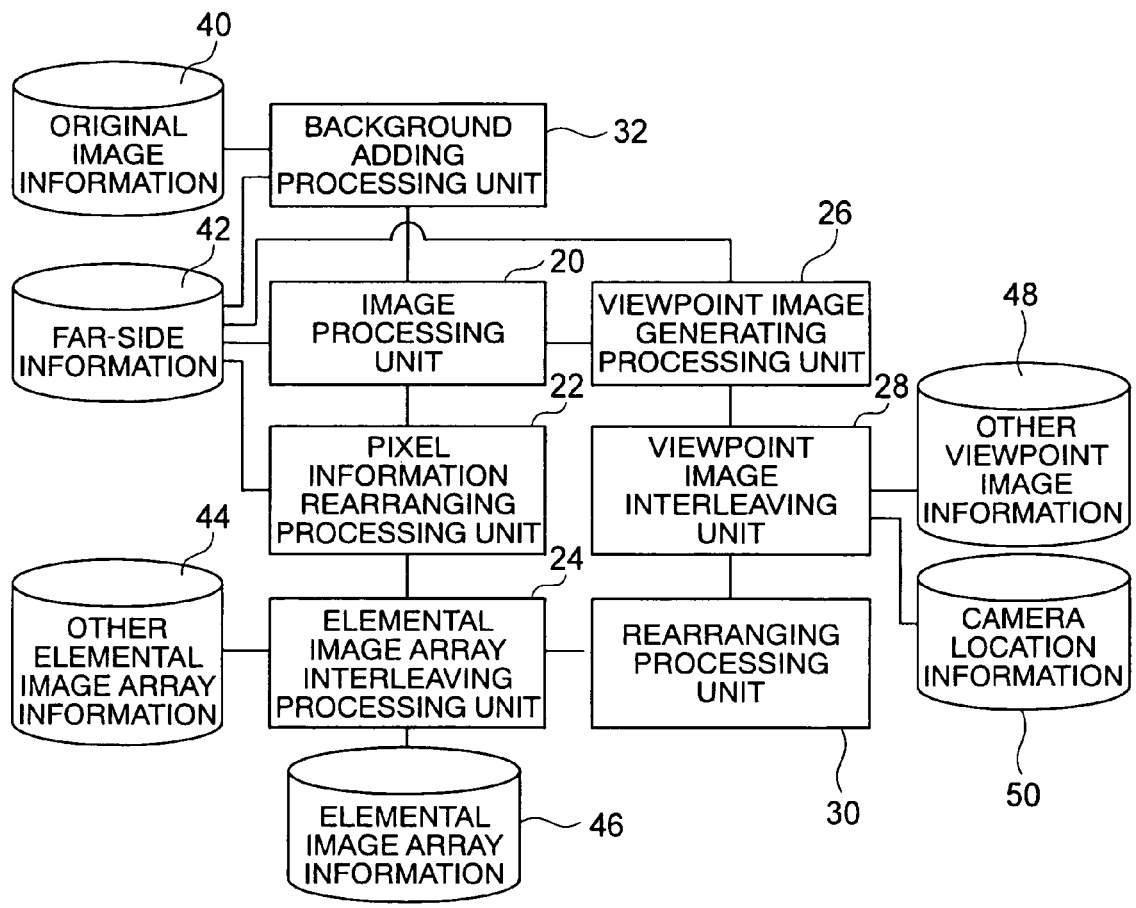
FIG. 5 is a block diagram showing a producing device according to a second embodiment of the present invention.

Referring now to FIGS. 5 through 15, an elemental image array producing device for three-dimensional image display according to a second embodiment of the present invention is described. The elemental image array producing device for three-dimensional image display according to this embodiment is a device in which the producing method of an elemental image array for three-dimensional image display according to the first embodiment is implemented. FIG. 5 shows the structure of the device. The elemental image array producing device of this embodiment includes an image processing unit 20, an image information rearranging processing unit 22, an elemental image array interleaving processing unit 24, a viewpoint image generating processing unit 26, a viewpoint image interleaving unit 28, and a rearranging processing unit 30.

A background adding processing unit 32 adds and combines a background image with the original image, based on original image information 40 and far-side information 42, in a case where the display area of the original image (shown as a star-shaped object in FIG. 9) to be displayed as a two-dimensional image is smaller than the area of the display face (indicated by the broken line in the drawing), and therefore, the original image is to be displayed in combination with another image (shadowed in the drawing), or in a case where a blue background is to be formed in preparation for a combination with another three-dimensional image.

Figure 6:
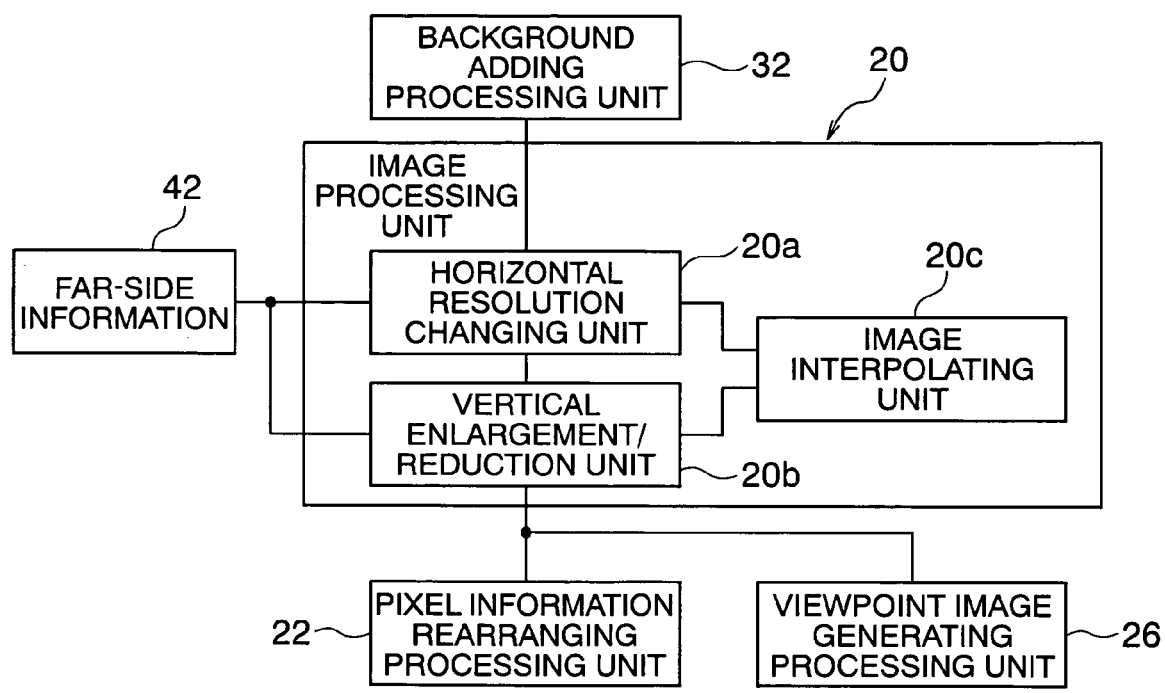
FIG. 6 is a block diagram showing one example of the image processing unit according to the producing device of the second embodiment.
Figure 10:
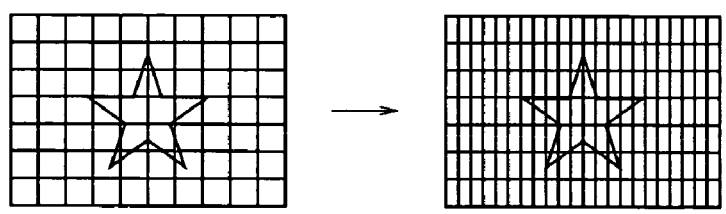
FIG. 10 is a diagram for showing one example of the changing processing content of the horizontal resolution changing unit according to the producing device of the second embodiment.
Figure 11:
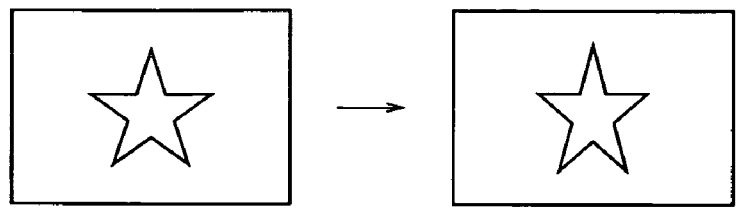
FIG. 11 is a diagram for explaining one example of enlargement/reduction processing content of the vertical enlargement/reduction unit according to the producing device of the second embodiment.

As shown in FIG. 6, the image processing unit 20 includes a horizontal resolution changing unit 20a, a vertical enlargement/reduction unit 20b, and an image interpolating unit 20c. Based on the output of the background adding processing unit 32 and the far-side information 42, the image processing unit 20 performs image processing. More specifically, based on the far-side information 42 and the output of the background adding processing unit 32, the horizontal resolution changing unit 20a performs an operation of increasing the horizontal resolution of the original image, as shown in FIG. 10. Based on the far-side information 42 and the output of the horizontal resolution changing unit 20a, the vertical enlargement/reduction unit 20b enlarges or reduces the image in the vertical direction, as shown in FIG. 11. Based on the output of the horizontal resolution changing unit 20a and the output of the vertical enlargement/reduction unit 20b, the image interpolating unit 20c performs the interpolating operation described in First Embodiment.

Figure 14:
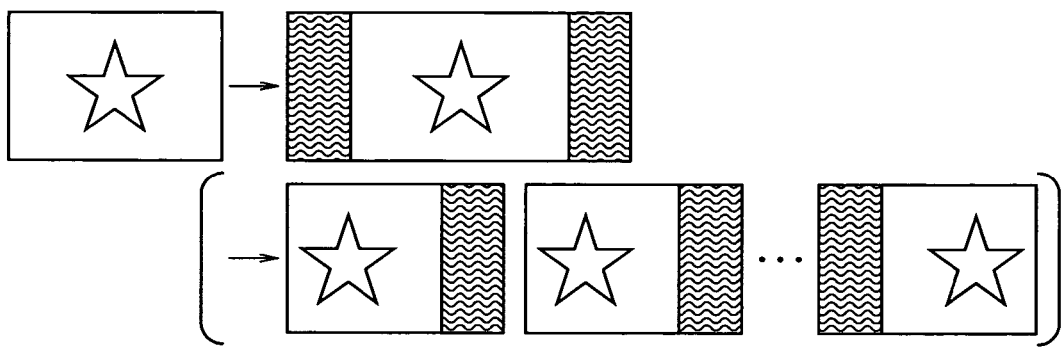
FIG. 14 is a diagram for explaining one example of the processing content of the horizontal pixel adding unit according to the producing device according to the second embodiment.

Based on the far-end information 42 and the output of the image processing unit 20, the image information rearranging processing unit 22 turns one input image into an elemental image array by rearranging the input image in conformity with the exit pupils. If necessary, the image information rearranging processing unit 22 may also include the processing of adding pixels (images) in the horizontal direction for rearrangement, as shown in FIG. 14.

Figure 12:
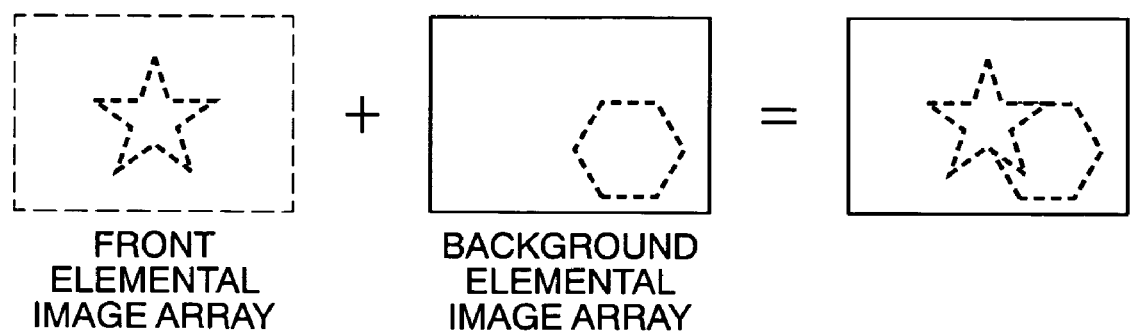
FIG. 12 is a diagram for explaining one example of the processing content of the elemental image array interleaving processing unit according to the producing device according of the second embodiment.

Based on the output of the image information rearranging processing unit 22 and other elemental image array information 44, the elemental image array interleaving processing unit 24 combines elemental image arrays, as shown in FIG. 12, and stores the combined elemental image arrays as elemental image array information 46.

Figure 7:
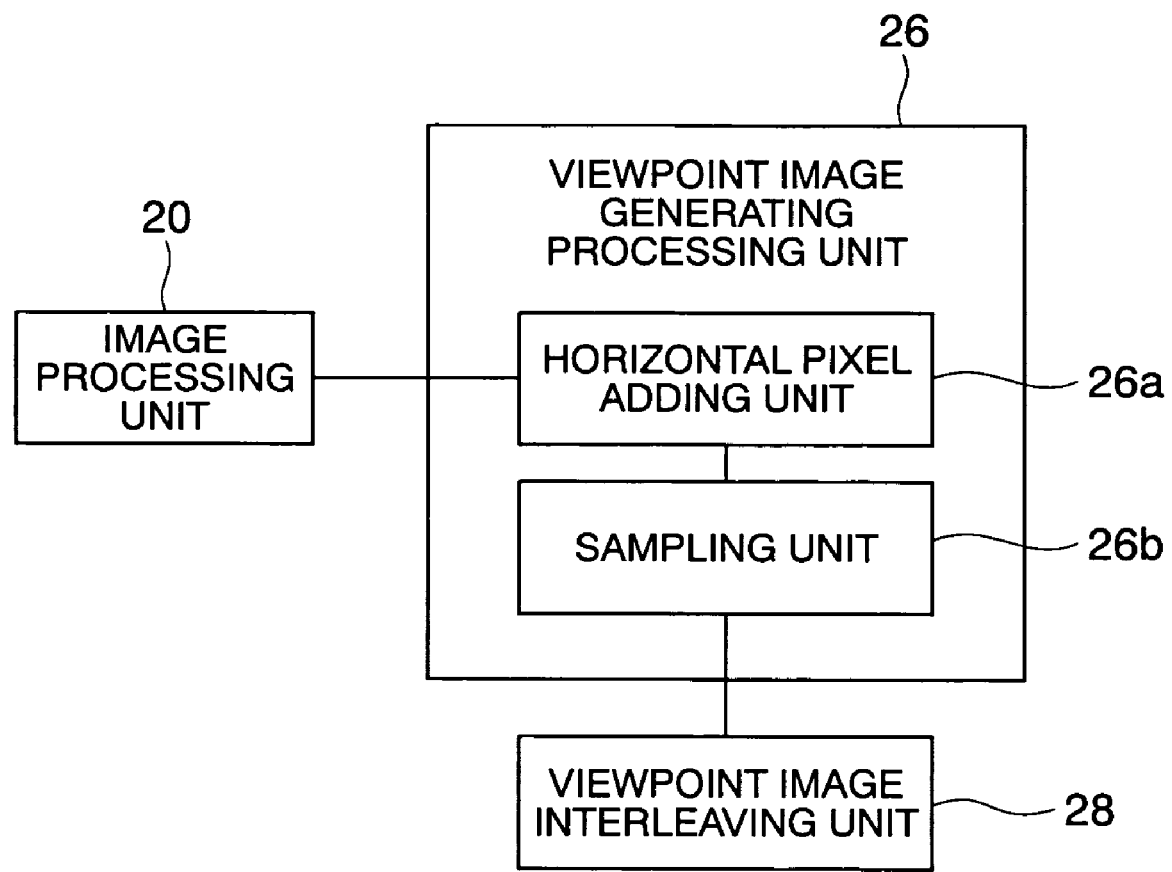
FIG. 7 is a block diagram showing one example of the viewpoint image generating processing unit according to the producing device of the second embodiment.
Figure 8:
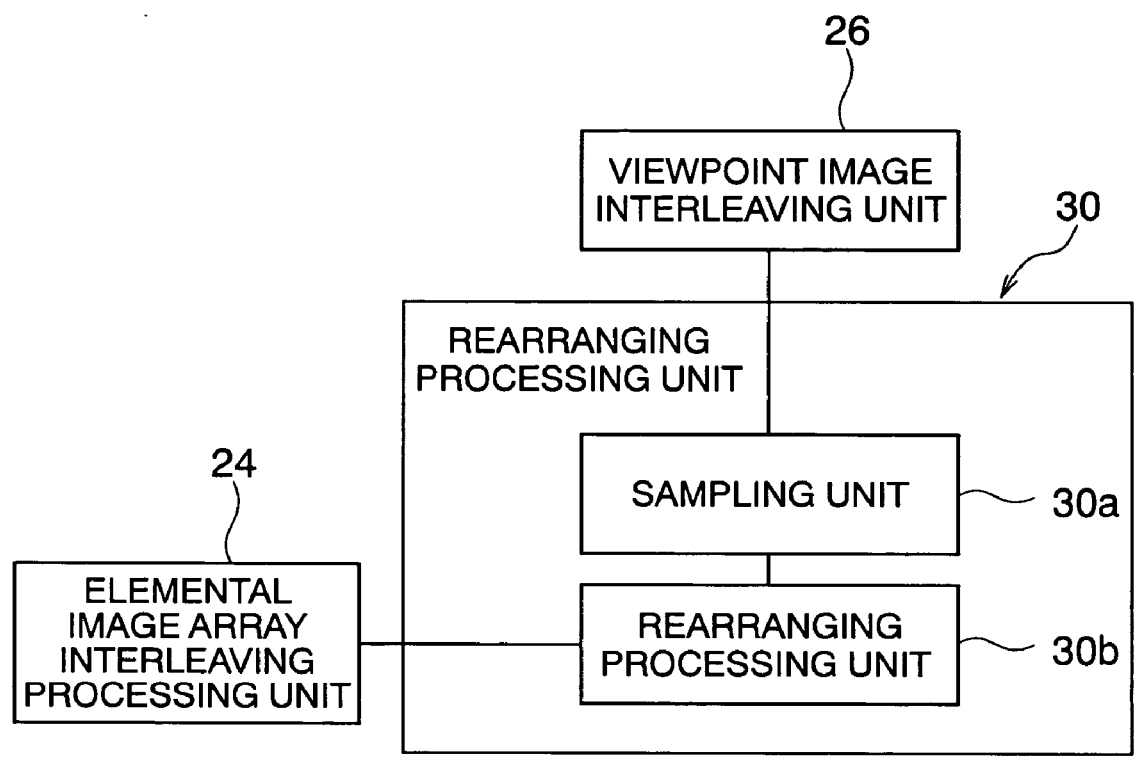
FIG. 8 is a block diagram showing a rearranging processing unit according to the producing device of the second embodiment.
Figure 9:
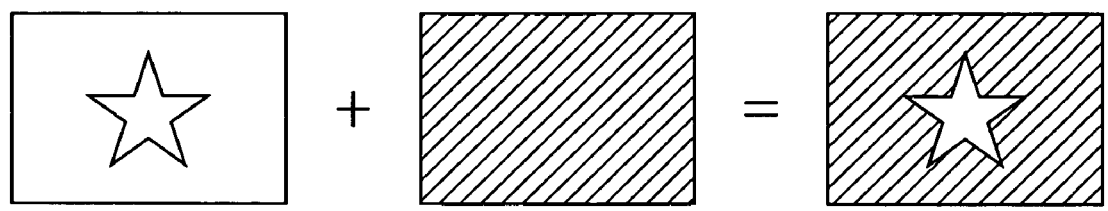
FIG. 9 is a diagram for explaining one example of the processing content of the background processing unit according to the producing device of the second embodiment.
Figure 13:
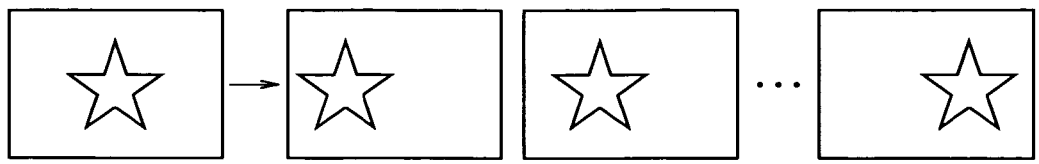
FIG. 13 is a diagram for explaining one example of the processing content of the viewpoint image generating processing unit according to the producing device of the second embodiment.

Based on the output of the image processing unit 20 and the far-side information 42, the viewpoint image generating processing unit 26 turns one input image into the same number of images as the number of viewing points by shifting the sampling position, as shown in FIG. 13. The viewpoint image generating processing unit 26 has a horizontal pixel adding unit 26a and a sampling unit 26b, as shown in FIG. 7. The horizontal pixel adding unit 26a adds pixels (images) in the horizontal direction, if necessary, so as to shift the sampling position, as shown in FIG. 14. The sampling unit 26b performs sampling.

Figure 15:
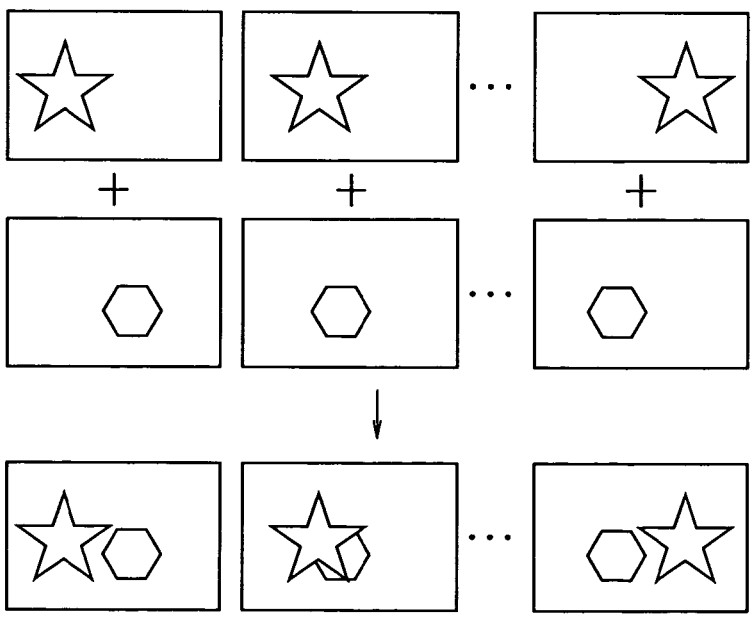
FIG. 15 is a diagram for explaining one example of the processing content of the sampling unit according to the producing device of the second embodiment.

Based on the output of the viewpoint image generating processing unit 26, other viewpoint image information 48, and location information 50 as to the camera obtaining viewpoint images, the viewpoint image interleaving unit 28 combines the viewpoint images with other viewpoint images, as shown in FIG. 15.

The rearranging processing unit 30 rearranges viewpoint images in conformity with the exit pupils, so as to produce an elemental image array.

To display a two-dimensional image as a background board, the values for m and n should be set so as to satisfy the following equation:

$$x\_far{:}g = (m/k/n) \times Pe{:}Pp$$

where x_far represents the display depth limit of the three-dimensional image display device, and x of the equation (4) is replaced with x_far.

To display a two-dimensional sprite image with continually varied depth directions, the values for m and n should be set so as to satisfy the following equation:

$$x\_shift{:}g = (m/k/n) \times Pe{:}Pp$$

where x_shift represents the variation of the two-dimensional sprite image in the depth direction, and x of the equation (4) is replaced with x_shift.

The elemental image array producing device for three-dimensional image display of this embodiment can display a two-dimensional image in a desired position simply through enlargement and reduction and rearrangement of the original two-dimensional image, as in the first embodiment. Furthermore, a desired aspect ratio can be maintained for each displayed image, and an elemental image array with an optimum interpolating effect can be produced.

Third Embodiment

Figure 16:
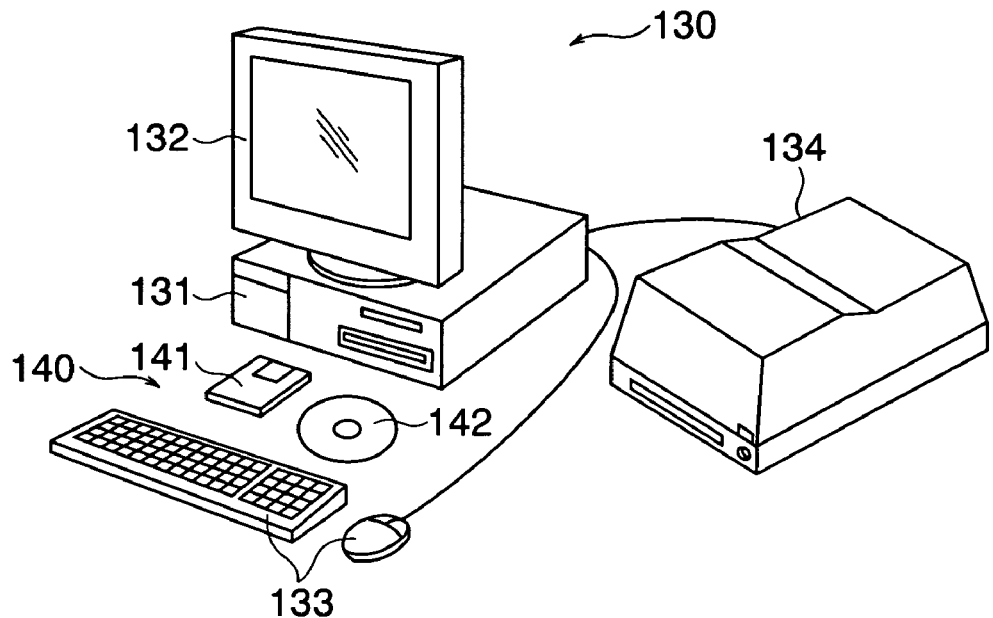
FIG. 16 is a perspective view showing one example of a computer system that executes a producing program according to a third embodiment of the present invention.
Figure 17:
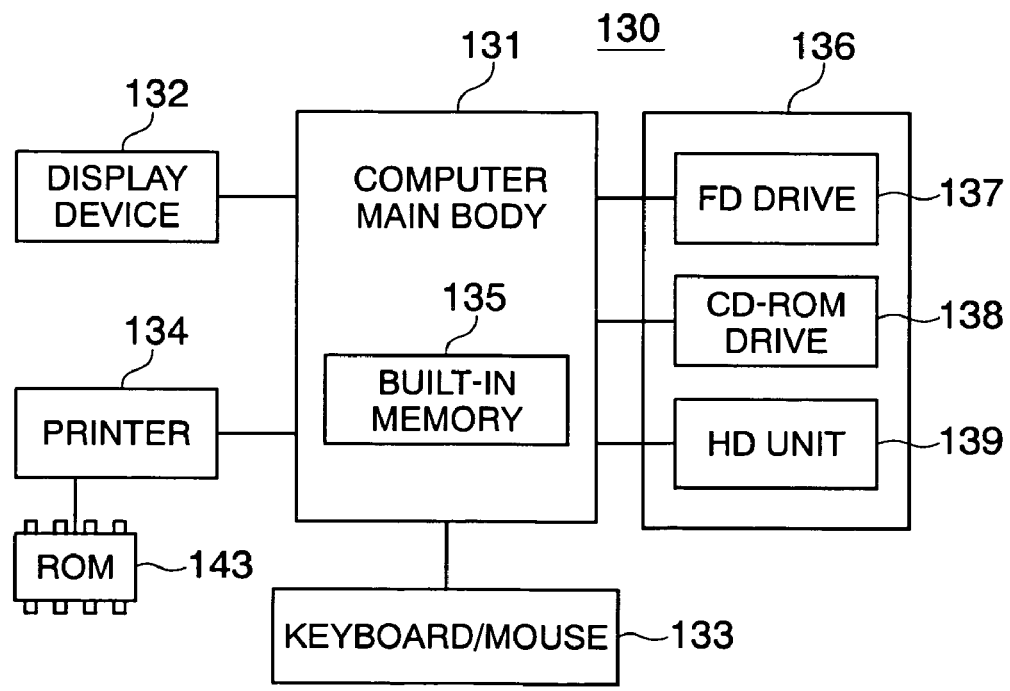
FIG. 17 is a block diagram showing the computer system that executes the producing program according to the third embodiment.

Referring now to FIGS. 16 and 17, a producing program of an elemental image array for three-dimensional image display according to a third embodiment of the present invention is described. The producing program of this embodiment is a program for implementing the producing method of an elemental image array for three-dimensional image display according to the first embodiment. FIG. 16 and FIG. 17 are a perspective view and a block diagram showing one example of a computer system 130 that executes the producing program of this embodiment.

In FIG. 16, the computer system 130 includes a computer main body 131 having a CPU, a display device 132 such as a CRT, an input unit 133 such as a keyboard and a mouse, and a printer 134 for performing printing.

As shown in FIG. 17, the computer main body 131 has a built-in memory 135 configured by a RAM, and a memory unit 136 that can be provided inside or outside the main body 131. The memory unit 136 includes a flexible or floppy disk (FD) drive 137, a CD-ROM drive 138, and a hard-disk drive (HD) unit 139. As shown in FIG. 16, examples of recording media 140 to be used in the memory unit 136 include a flexible disk or a floppy disk (FD) 141 to be inserted to the slot of the FD driver 137, and a CD-ROM 142 to be used in the CD-ROM drive 138.

As shown in FIGS. 16 and 17, the recording media 140 to be used in a general computer system are the FD 141 and the CD-ROM 142.

It is of course possible to use other computer-readable recording media, such as a FD, a CD-ROM, a MO (Magneto-Optical) disk, a DVD (Digital Versatile Disk), any other optical recording disk, a card memory, and a magnetic tape.

The producing program of this embodiment is designed to involve at least steps S1 through S4 shown in FIG. 1.

The producing program of an elemental image array for three-dimensional image display of this embodiment may be stored in a computer connected to a network such as the Internet, and may be downloaded for use via the network.

It may be configured to provide or distribute the producing program of an elemental image array for three-dimensional image display of this embodiment via a network such as the Internet.

Example 1

The two-dimensional image display device 2 in FIG. 2 is a liquid crystal display device, and the light-ray control element 3 is provided on the front side of the display device 2. A backlight (not shown) is provided on the back side of the display device 2. As the liquid crystal display device, a W-UXGA-LCD panel (number of pixels: 1920×1200; screen size 331.2 mm×207.0 mm, for example) is used. The pixel size is a square of 172.5 µm×172.5 µm, the horizontal width of each of the sub-pixels of red, green, and blue is 57.5 µm, and the vertical width of each of the sub-pixels is 172.5 µm. The sub-pixels can be driven independently of one another. In the general two-dimensional image display device 2, the three sub-pixels of red, green, and blue transversely aligned constitute one pixel. However, this arrangement does not apply in this example, and a "mosaic arrangement" is employed as the color filter arrangement.

A lenticular sheet that is designed to have a focal length slightly longer than the distance between the liquid crystal panel and the pixel position is employed as the light-ray control element 3. The crosstalk of the lenticular sheet is 2. With this lenticular sheet, parallax information can be provided only in the horizontal direction.

With the number of parallaxes in the three-dimensional image display device being 18, the horizontal resolution thereof is 1920×3/18=320. The vertical resolution is 1200/3=400 pixels, as each three sub-pixels aligned in the vertical direction of the mosaic arrangement constitute a 3D pixel. Therefore, an image that is of the same size as the display, has the longitudinal and transverse resolutions of 320×400, and has a pixel aspect ratio of 1.33333 is prepared as an original image. The transverse resolution of this original image is multiplied by four only in the horizontal direction, using a filter of the "bicubic method". Each viewpoint image of the original image is then shifted by 1 pixel, so as to produce an elemental image array. Since the sampling position needs to be shifted, one extra viewpoint is added to either side of the original image. Through the rearrangement of the viewpoint images, an elemental image array is produced and displayed. According to the equation (1):

$$\begin{aligned} x &= m/n \times Pe/Pp \times g \\ &= 1/4 \times (18 \times 0.0575)/0.0575 \times 1.5 \\ &= 6.75\,\text{mm} \end{aligned}$$

where it is confirmed that the original image is displayed in the near-side position at 6.75 mm.

Comparative Example 1

Under the same conditions as those in Example 1, n-times enlargement/reduction in the horizontal direction is not performed, and viewpoint images are produced by shifting the sampling position of the original image by a unit pixel. The display position is changed according to the equation (1). As a result, the display position can be set only at multiples of 2.7 cm.

Example 2

Under the same conditions as those in Example 1, a two-dimensional image is to be displayed in a position at +5 cm, which is the nearest possible point. Here, the following equation is established:

$$m/n = x \times Pp/Pe/g$$
$$= 50 \times 0.0575/(0.575 \times 18)/1.5$$
$$= 1.85$$
$$\sim 9/5$$

where 5-times enlargement is performed in the horizontal direction, using a filter of the "bicubic method". According to the equation (2), 1.08-times enlargement is also performed in the vertical direction:

$$H'/H = L/(L-x) = 700/(700-50) = 1.08$$

In this manner, viewpoint images are produced through the procedures shown in FIG. 1, and the viewpoint images are rearranged so as to form an elemental image array. As the elemental image array is displayed, a two-dimensional image with a desired aspect ratio can be displayed in the position at +5 cm, which is exactly the nearest possible point for display.

Comparative Example 2

If the vertical expansion is not performed in Example 2, the transverse size of the resultant two-dimensional image is 8% enlarged compared with its longitudinal size. As a result, the two-dimensional image gives the impression that it is elongated in the horizontal direction.

As described so far, in each of the embodiments of the present invention, a two-dimensional image can be displayed in a desired position simply through enlargement/reduction and rearrangement of the original two-dimensional image in a three-dimensional image display device. Furthermore, a desired aspect ratio can be maintained for each displayed image, and an elemental image array with an optimum interpolating effect can be produced.

In a case where the distance between the lens array and the two-dimensional image display pixels is longer than the lens focal distance, the information of the parallaxes is reversed when viewed through cylindrical lenses, and an interpolating effect utilizing this phenomenon can also be expected. A two-dimensional image is displayed in a near-side position in which the arrangement of the parallax information of the elemental image array is opposite to the arrangement of the two-dimensional image. In this manner, the information of the parallaxes viewed through cylindrical lenses interpolates information between the cylindrical lenses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A method for producing an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the method comprising:

making a horizontal resolution of a two-dimensional image, that is k times as high as the resolution of the three-dimensional image display device, to be n times as high as the resolution of the three-dimensional image display device, wherein $n \geq 1$;

after making the horizontal resolution n times as high as the resolution of the three-dimensional image display device, obtaining the multi-view images by shifting a sampling position to perform sampling on the two-dimensional image in the horizontal direction at every m pixels, wherein $m \geq 1$, so as to satisfy the following equation:

$$x:g=(m/k/n) \times Pe:Pp,$$

where x represents a distance between a position to display the two-dimensional image and the display face of the three-dimensional image display device, g represents an air-conversion gap between the exit pupils and the two-dimensional image display unit, Pe represents an exit pupil pitch, and Pp represents a pixel pitch;

enlarging or reducing the viewpoint images in a longitudinal direction; and rearranging the multi-view images to form the elementary image array according to the positional relationship between the exit pupils and the projecting directions.

2. The method for producing an elemental image array for three-dimensional image display as claimed in claim 1, wherein vertical enlargement or reduction is performed so as to satisfy the following equation:

$$y=y' \times L/(L-x),$$

where L represents a predetermined viewing distance of the three-dimensional image display device, y represents a height of each of the viewpoint images or the elemental image array, and y' represents a height of an original two-dimensional image having an unadjusted resolution.

3. The method for producing an elemental image array for three-dimensional image display as claimed in claim 1, wherein the two-dimensional image is displayed as a background board by selecting values for m and n so as to satisfy the following equation:

$$x\_far:g=(m/k/n) \times Pe:Pp$$

where x_far represents a farthest possible display position of the three-dimensional image display device.

4. The method for producing an elemental image array for three-dimensional image display as claimed in claim 1, wherein a depth direction of a two-dimensional sprite image to be displayed is continuously varied by selecting the values for m and n so as to satisfy the following equation:

$$x\_shift:g=(m/k/n) \times Pe:Pp$$

where x_shift represents a farthest possible display position of the two-dimensional sprite image.

5. The method for producing an elemental image array for three-dimensional image display as claimed in claim 1, wherein the following equation is satisfied:

$$(m/k/n)=1/c,$$

where c represents a number of pixels that can be viewed through the exit pupils at the same time, so that the two-dimensional image having a higher resolution than the resolution of the three-dimensional image display device is displayed with the pixels that can be viewed through the exit pupils by using the number of pixels that can be viewed through the exit pupils.

6. A device for producing an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the device comprising:

an image processing unit that comprises a horizontal resolution changing unit that makes a horizontal resolution of a two-dimensional image, that is k times as high as the horizontal resolution of the three-dimensional image display device, to be n times as high as the resolution of the three-dimensional image display device, wherein $n \geq 1$;

a multi-view image generating unit that, after making the horizontal resolution n times as high as the resolution of the three-dimensional image display device, obtains the multi-view images by shifting a sampling position to perform sampling on the two-dimensional image in the horizontal direction at every m pixels, where $m \geq 1$, after so as to satisfy the following equation:

$$x:g=(m/k/n) \times Pe:Pp$$

where x represents a distance between a position to display the two-dimensional image and the display face of the three-dimensional image display device, g represents an air-conversion gap between the exit pupils and the two-dimensional image display unit, Pe represents an exit pupil pitch, and Pp represents a pixel pitch;

an enlargement and reduction unit that enlarges or reduces the viewpoint images in a longitudinal direction; and a rearranging processing unit that rearranges the multi-view images to form the elementary image array according to the positional relationship between the exit pupils and the projecting directions.

7. The device for producing an elemental image array for a three-dimensional image display in a three-dimensional image display device as claimed in claim 6, wherein the image processing unit further comprises an image interpolating unit that interpolates the two-dimensional image according to the display position of the two-dimensional image, based on an output of the horizontal resolution changing unit and an output of the enlargement and reduction unit.

8. A computer-readable medium having instructions stored thereon, wherein the instructions, when executed by a processor, perform a method for producing an elemental image array for three-dimensional image display in a three-dimensional image display device of a horizontal parallax type that includes a two-dimensional image display unit having a plurality of pixels arranged two-dimensionally therein, and a light-ray control element that has a plurality of exit pupils for controlling light rays emitted from the pixels in such a manner that a position for viewing image information represented by the pixels is varied for each pixel, a plurality of pixels being horizontally allocated to each one of the exit pupils, the pixels allocated to the exit pupils forming a set of elemental image display pixels, parallax information being generated in a horizontal direction by allocating image information to each of the elemental image display pixels according to directions in which the elemental image display pixels are viewed through the exit pupils, the three-dimensional image display device of the horizontal parallax type using the parallax information to cause a viewer to recognize a three-dimensional image, pixel information of multi-view images projected onto a display face of the three-dimensional image display device in various directions with respect to the horizontal direction being allocated to the elemental image display pixels according to projecting directions, thereby producing the elemental image array for three-dimensional image display, the method comprising:

making a horizontal resolution of a two-dimensional image, that is k times as high as the resolution of the three-dimensional image to display device, to be n times as high as the resolution of the three-dimensional image display device, wherein $n \geq 1$;

after making the horizontal resolution n times as high as the resolution of the three-dimensional image display device, obtaining the multi-view images by shifting a sampling position to perform sampling on the two-dimensional image in the horizontal direction at every m pixels, where $m \geq 1$, so as to satisfy the following equation:

$$x:g=(m/k/n) \times Pe:Pp$$

where x represents a distance between a position to display the two-dimensional image and the display face of the three-dimensional image display device, g represents an air-conversion gap between the exit pupils and the two-dimensional image display unit, Pe represents an exit pupil pitch, and Pp represents a pixel pitch;

enlarging or reducing the viewpoint images in a longitudinal direction; and rearranging the multi-view images to form an elementary image array according to the positional relationship between the exit pupils and the projecting directions.

* * * * *